United States Patent
Ganig et al.

(10) Patent No.: US 11,653,411 B2
(45) Date of Patent: May 16, 2023

(54) METHODS AND SYSTEMS FOR MANAGING SNPN ACCESS MODE

(71) Applicant: SAMSUNG ELECTRONICS CO., LTD., Suwon-si (KR)

(72) Inventors: Chetan Ramesh Ganig, Bangalore (IN); Prasad Basavaraj Dandra, Bangalore (IN); Vijay Ganesh Surisetty, Bangalore (IN); Umasankar Ceendhralu Baskar, Bangalore (IN); Suraj Kumar Singh, Bangalore (IN); Kundan Tiwari, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 91 days.

(21) Appl. No.: 17/400,842

(22) Filed: Aug. 12, 2021

(65) Prior Publication Data

US 2022/0053600 A1    Feb. 17, 2022

(30) Foreign Application Priority Data

Aug. 12, 2020   (IN) .............................. 202041034735
Aug. 11, 2021   (IN) .............................. 202041034735

(51) Int. Cl.
*H04W 76/50*   (2018.01)
*H04W 48/18*   (2009.01)
*H04W 36/08*   (2009.01)
*H04W 48/16*   (2009.01)
*H04W 84/04*   (2009.01)

(52) U.S. Cl.
CPC .......... *H04W 76/50* (2018.02); *H04W 36/08* (2013.01); *H04W 48/16* (2013.01); *H04W 48/18* (2013.01); *H04W 84/042* (2013.01)

(58) Field of Classification Search
CPC ..... H04W 76/50; H04W 36/08; H04W 48/16; H04W 48/18
USPC ..................................................... 455/404.1
See application file for complete search history.

(56) References Cited

PUBLICATIONS

3GPP TS 23.122, V16.6.1 (Jul. 2020), 3rd Generation Partnership Project; Technical Specification Group Core Network and Terminals; Non-Access-Stratum (NAS) functions related to Mobile Station (MS) in idle mode (Release 16), 81 pages.
3GPP TS 24.501 V16.5.1 (Jul. 2020), 3rd Generation Partnership Project; Technical Specification Group Core Network and Terminals; Non-Access-Stratum (NAS) protocol for 5G System (5GS); Stage 3; (Release 16), 709 pages.

*Primary Examiner* — Joel Ajayi
(74) *Attorney, Agent, or Firm* — F. Chau & Associates, LLC

(57) ABSTRACT

A method disclosed herein includes selecting, by the UE, a SNPN for registration, on the SNPN access mode being enabled. The method includes disabling, by the UE, the SNPN access mode, if the selected SNPN does not support at least one emergency service. The method includes enabling, by the UE, a Public Land Mobile Network (PLMN) selection mode to select a PLMN cell supporting the at least one emergency service, on the SNPN access mode being disabled. The method includes performing, by the UE, the at least one emergency service by camping on the selected PLMN cell. The method includes enabling, by the UE, the SNPN access mode for performing a SNPN selection procedure, on completion of the at least one emergency service.

19 Claims, 14 Drawing Sheets

METHODS AND SYSTEMS FOR MANAGING SNPN ACCESS MODE

CROSS REFERENCE TO RELATED APPLICATION

The present application claims priority under 35 U.S.C. § 119 to Indian Provisional Patent Application No. 202041034735, filed on Aug. 12, 2020, and Indian Non-Provisional Patent Application No. 202041034735, filed on Aug. 11, 2021, the entire contents of both applications are incorporated by reference herein.

TECHNICAL FIELD

The present disclosure relates to the field of wireless networks and more particularly to managing Standalone Non-Public Network (SNPN) access mode on a User Equipment (UE).

BACKGROUND

In general, a non-public network (NPN) is a network, which is intended for non-public use. The NPN is deployed in a variety of configurations utilizing both virtual and physical elements.

The NPN enables a private traffic to be confined within boundaries of defined premises without necessity to reach a public domain, which may be desirable for several reasons such as:

Quality-Of-Service (QoS) requirements of mission critical use cases: Some of the mission critical services demand a close-to-zero milliseconds (ms) latency and reliability. The only way to satisfy such challenging requirements is to have a dedicated 5G network within a factory with 5G network functions and service applications as close as possible to devices/User Equipments (UEs) by utilizing enhanced 3GPP reliability mechanisms;

Very high security requirements: The high security requirements may be satisfied by having strong security credentials and specific authorization mechanism; and Isolation from a public network: Isolation from the public network/Public Land Mobile Network (PLMN) enables protecting the NPN against security attacks or malfunctions (for example: service outage) in the PLMN.

The NPN may be deployed as a Public network integrated NPN, or a Standalone NPN (SNPN). The Public network integrated NPN is deployed with the support of the PLMN.

The SNPN is operated by a NPN operator without relying on network functions provided by the PLMN. A UE may access the one or more SNPNs by having subscriptions/permissions for the one or more SNPNs. A combination of a PLMN Identifier (ID) and a Network Identifier (NID) identifies the SNPN. The UE having the permissions for accessing the SNPN (referred herein after as SNPN enabled UE) may be configured with a subscriber identifier (SUPI) and credentials of each subscribed SNPN, which has been identified by the combination of the PLMN ID and the NID. The UE may receive a list of available NPN IDs from a System Information Block (SIB). The UE may also access the SNPN via the PLMN.

The UE selects the SNPN for receiving communication services, while operating in a SNPN access mode. While operating in the SNPN access mode, the UE does not perform a normal PLMN selection. The UE operating in the SNPN access mode reads the available PLMN IDs and the list of available NIDs from broadcast system information.

The UE selects the SNPN in an automatic SNPN selection mode or a manual SNPN selection mode based on the read available PLMN IDs and the list of available NIDs. In the automatic SNPN selection mode, the UE selects and attempts to register with the available SNPN identified by the PLMN ID and the NID, for which the UE has the SUPI and the credentials of the SNPN. In the manual SNPN selection mode, the UE provides the list of available NIDs and related human-readable names (if available) of the available SNPNs for which the UE has the SUPI and the credentials of each subscribed SNPN to a user of the UE. The user selects and registers with the SNPN from the available SNPNs for the communication services. However, in typical versions of 3rd Generation Partnership Project (3GPP) (3GPP TS 23.122 and 24.501), the SNPN does not support emergency services or Public Warning System (PWS) notifications. Thus, the UE may not be able to perform the emergency services or receive the PWS notifications on the selected SNPN.

Further, consider that the UE registers on the normal PLMN selected in an automatic PLMN selection mode or a manual PLMN selection mode and the user of the UE performs the SNPN selection in the manual SNPN selection mode and the user does not select any of the SNPNs. In such a scenario, the UE enters a no service or limited-service state (as defined in 3GPP TS 23.122).

In addition, the typical versions of the 3GPP do not support mechanisms which enable the UE to switch between the SNPN selection mode and the PLMN/Closed Access Group (CAG)/Closed Subscriber Group (CSG) mode.

FIG. 1a depicts example scenarios, wherein the UE may not be able to perform the emergency (EMC) services on the registered/camped SNPN.

Consider an example scenario 1, wherein the UE registers on the SNPN that has been selected in the automatic SNPN selection mode or the manual SNPN selection mode. The UE triggers the emergency service (for example, an emergency call) on the registered SNPN. However, the UE may not be able to perform the emergency call, as the registered SNPN does not support the emergency services and the UE is not allowed to select the PLMN for the emergency call/services in the SNPN access mode.

Consider an example scenario 2, wherein the UE attempts to register with the SNPN 1 selected in the automatic SNPN selection mode or the manual SNPN selection mode. In such a scenario, for example, consider that the UE fails to register with the SNPN 1 or the SNPN 1 is not found (i.e., the SNPN 1 is Out of Service (OOS)), then the UE enters limited camping and camps on any available SNPN. The UE initiates the emergency call on the camped SNPN. However, the UE may not be able to perform the emergency call, as the camped SNPN does not support the emergency services.

Consider an example scenario 3, wherein the UE is in the automatic SNPN selection mode or the manual SNPN selection mode and list of subscriber data for the UE is empty. In such a scenario, the UE camps on any available SNPN and enters the limited-service state. The UE triggers the emergency call on the camped SNPN. However, the UE may not be able to perform the emergency call, as the camped SNPN does not support the emergency services.

FIG. 1b depicts example scenarios, wherein the UE may not be able to receive the PWS notifications on the registered/camped SNPN.

Consider an example scenario 1, wherein the UE attempts to register with the SNPN 1 selected in the automatic SNPN selection mode or the manual SNPN selection mode. In such a scenario, for example, consider that the UE fails to register with the SNPN 1 or the SNPN 1 is not found (i.e., the SNPN 1 is OOS), then the UE enters limited camping and camps on any available SNPN. The UE or a Universal Subscriber Identity module (USIM) of the UE or the SNPN subscription has been configured with SNPN specific PWS warning message identifiers (IDs) for reception of the PWS notifications. However, the UE may not be able to receive the PWS notifications corresponding to the configured PWS warning message IDs, as the camped SNPN does not support the PWS notifications.

Consider an example scenario 2, wherein the UE is in the automatic SNPN selection mode or the manual SNPN selection mode and list of subscriber data for the UE is empty. In such a scenario, the UE camps on any available SNPN and enters the limited-service state. The UE has been configured with SNPN specific PWS warning message IDs. However, the UE may not be able to receive the PWS notifications corresponding to the configured PWS warning message IDs, as the camped SNPN does not support the PWS notifications.

Consider an example scenario 3, wherein the UE attempts to register with the SNPN 1 selected in the automatic SNPN selection mode or the manual SNPN selection mode. In such a scenario, for example, consider that the UE fails to register with the SNPN 1 or the SNPN 1 is not found (i.e., the SNPN 1 is OOS), then the UE enters limited camping and camps on any available SNPN. Also, the UE is not configured with any PWS warning message IDs, so that the UE may be able to receive all the PWS notifications. However, the UE may not be able to receive the PWS notifications, as the camped SNPN does not support the emergency services and the PWS notifications.

FIG. 1c depicts an example scenario, wherein the UE enters the limited-service state, when the user of the UE does not select the SNPN from a SNPN list displayed as result of the manual SNPN selection mode.

Consider an example scenario, wherein the UE registers on the normal PLMN selected in the automatic PLMN selection mode or the manual PLMN selection mode. The user of the UE performs the SNPN selection in the manual SNPN selection mode and the user of the UE does not select the SNPN network from the SNPN list displayed to the user. In such a scenario, the UE attempts to camp on any acceptable SNPN and enter the limited-service state. Thus, if the user has not selected the SNPN and if previously the UE was not in the SNPN access mode, the UE enters the limited-service state or no service state.

FIG. 1d depicts example scenario, wherein the UE may not be able to switch between access modes.

Consider an example scenario 1, wherein the UE is registered on the SNPN in the SNPN access mode. When the SNPN access mode is being enabled, the user of the UE performs the PLMN selection in the manual PLMN selection or CSG selection or CAG selection for enabling PLMN access mode, or a CSG access mode, or a CAG access mode, respectively. However, the current 3GPP specification does not define the procedures when the UE switches between the various access modes.

Consider an example scenario 2, wherein the UE is in the manual PLMN access mode, or the CSG access mode, or the CAG access mode. The user further performs the selection of the SNPN access mode (either automatic SNPN selection mode or the manual SNPN selection mode). However, the current 3GPP specification does not define the procedure for the UE to switch between the various access modes.

Embodiments herein disclose methods and systems for managing a Standalone Non-Public Network (SNPN) access mode on a User Equipment (UE).

Some embodiments herein disclose methods and systems for disabling the SNPN access mode and enabling a Public Land Mobile Network (PLMN) access mode on initiating at least one emergency service by the UE in the SNPN access mode.

Other embodiments herein disclose methods and systems for performing the at least one emergency service by camping on a PLMN cell selected in the PLMN access mode and enabling the SNPN access mode or continuing in the PLMN access mode for a limited service and searching for the SNPN through a background scan in the PLMN access mode, once the at least one emergency service has been completed.

SUMMARY

Accordingly, the embodiments herein provide methods and systems for managing a Standalone Non-Public Network (SNPN) access mode on a User Equipment (UE). The method includes selecting, by the UE, a SNPN for registration, on the SNPN access mode being enabled. The method includes disabling, by the UE, the SNPN access mode, if the selected SNPN does not support at least one emergency service. The method includes enabling, by the UE, a Public Land Mobile Network (PLMN) selection mode to select a PLMN cell supporting the at least one emergency service, on the SNPN access mode being disabled. The method includes performing, by the UE, the at least one emergency service by camping on the selected PLMN cell. The method includes enabling, by the UE, the SNPN access mode for performing a SNPN selection procedure, on completion of the at least one emergency service.

Accordingly, embodiments herein provide a User Equipment (UE) comprising a memory and a processor coupled to the memory. The processor is configured to select a SNPN for registration, on the SNPN access mode is being enabled. The processor is configured to disable the SNPN access mode, if the selected SNPN does not support at least one emergency service. The processor is configured to enable a Public Land Mobile Network (PLMN) selection mode to select a PLMN cell supporting the at least one emergency service, on the SNPN access mode being disabled. The processor is configured to perform the at least one emergency service by camping on the selected PLMN cell. The processor is configured to enable the SNPN access mode for performing a SNPN selection procedure, on completion of the at least one emergency service.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DESCRIPTION OF EMBODIMENTS

Figure 1A:
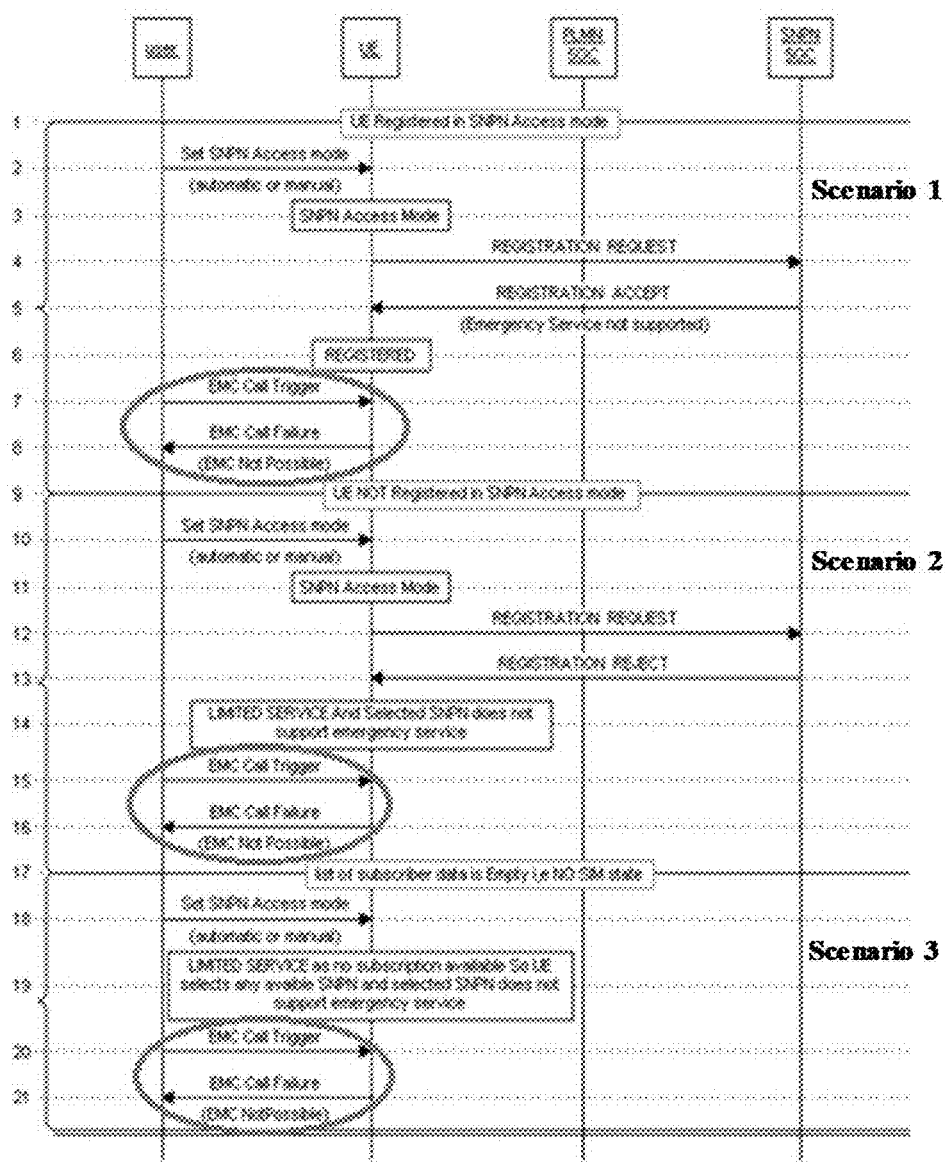
FIG. 1a depicts example scenarios, wherein a User Equipment (UE) may not be able to perform emergency (EMC) services on a registered/camped Standalone Non-Public Network (SNPN)
Figure 1B:
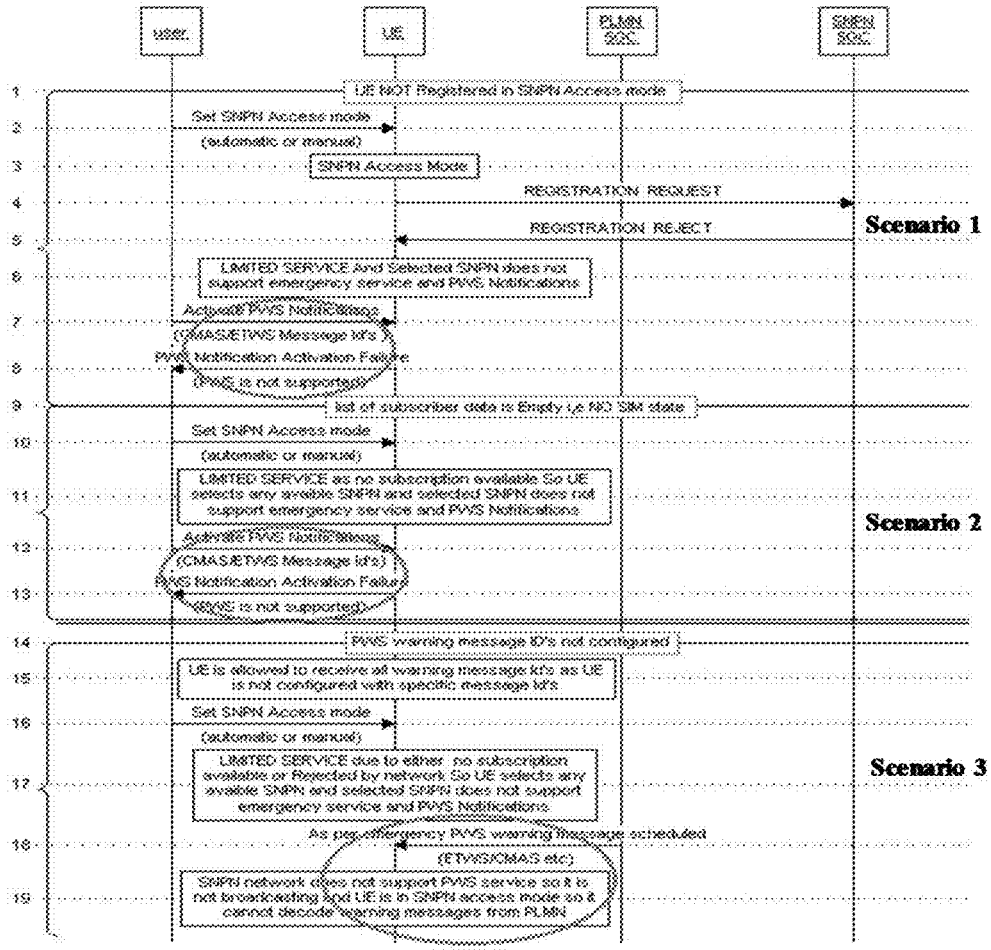
FIG. 1b depicts example scenarios, wherein the UE may not be able to receive Public Warning System (PWS) notifications on the registered/camped SNPN.
Figure 1C:
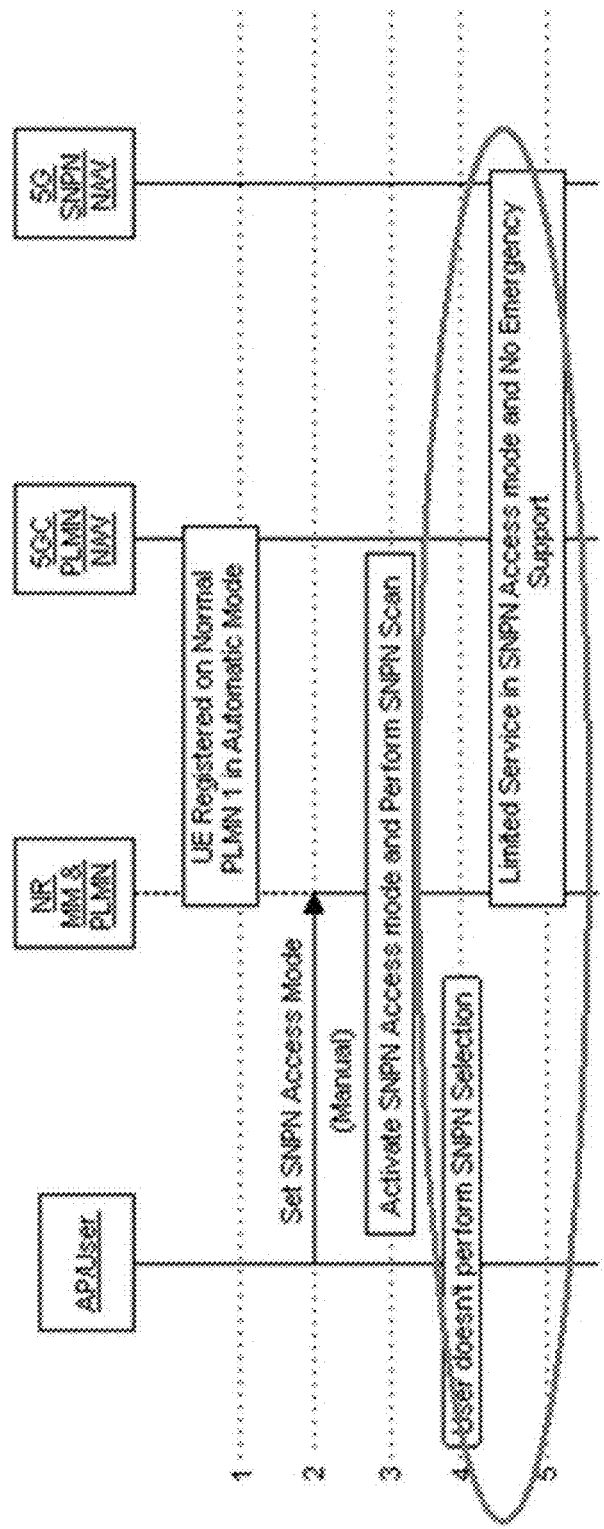
FIG. 1c depicts an example scenario, wherein the UE enters the limited-service state, when a user of the UE does not select a SNPN from a SNPN list displayed as a result of a manual SNPN selection mode.
Figure 1D:
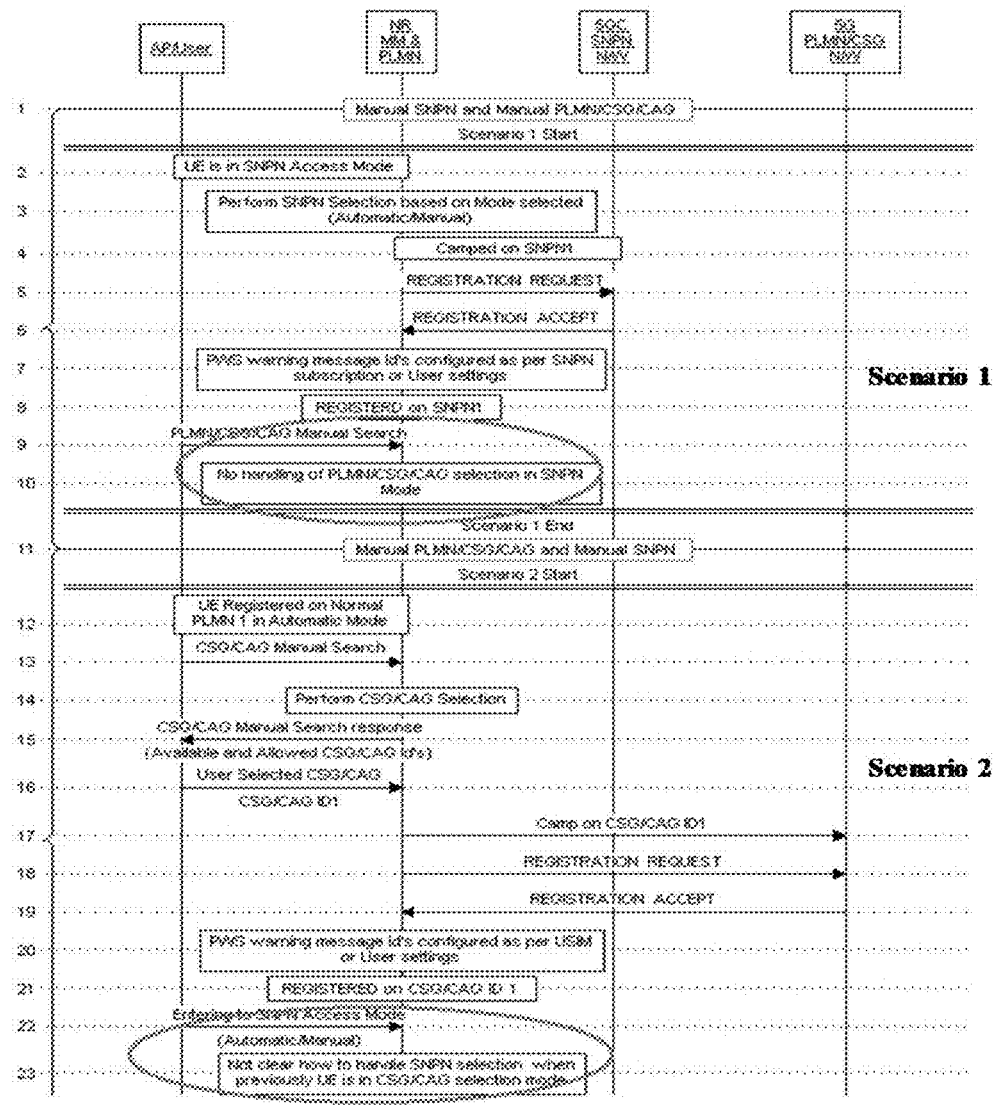
FIG. 1d depicts example scenario, wherein the UE may not be able to switch between various access modes.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein provide methods and systems for managing a Standalone Non-Public Network (SNPN) access mode on a User Equipment (UE). Referring now to the drawings, and more particularly to FIGS. 2 through 10b, where similar reference characters denote corresponding features consistently throughout the figures, there are shown example embodiments.

Figure 2:
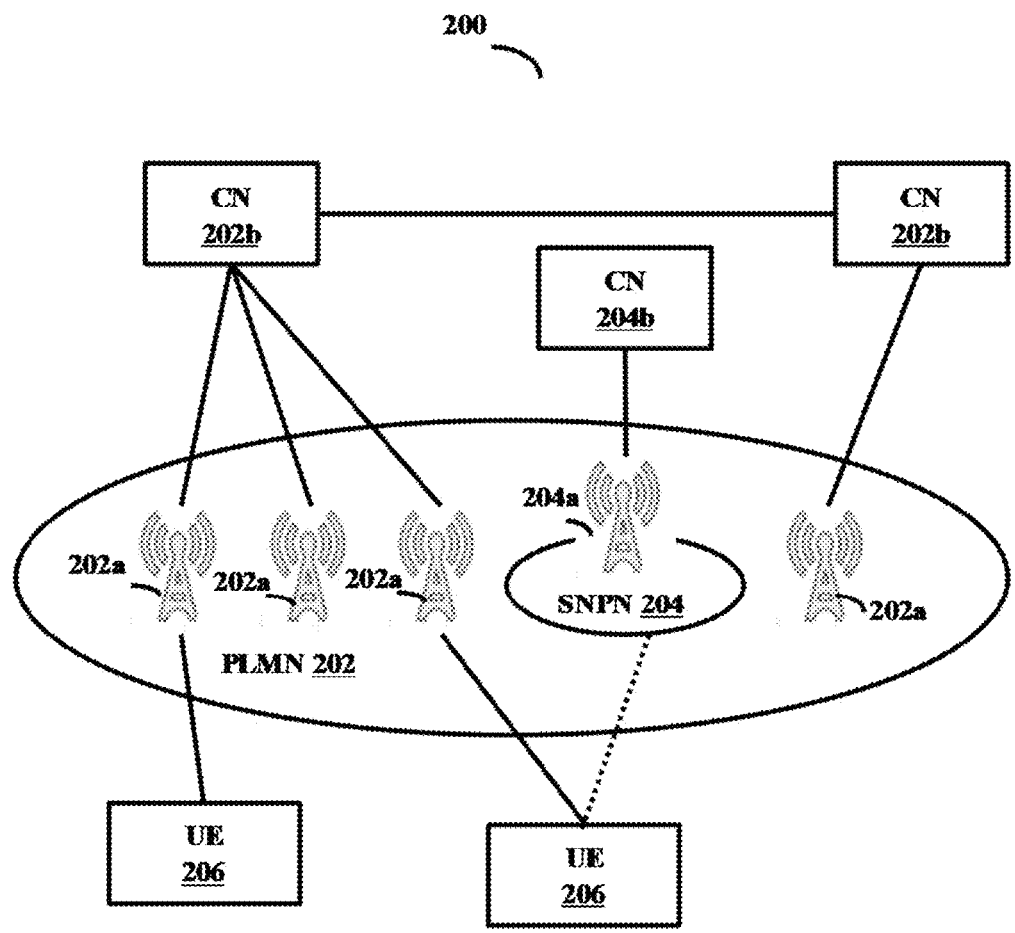
FIG. 2 depicts a wireless communication system/wireless network, according to embodiments as disclosed herein.

FIG. 2 depicts a wireless communication system/wireless network 200, according to embodiments as disclosed herein. The wireless network 200 includes at least one Public Land Mobile Network (PLMN) 202, at least one non-public network (NPN) 204, and a plurality of User Equipments (UEs) 206.

The PLMN 202 may be configured to provide PLMN services to the UEs 206 in a specific region. The PLMN services include normal communication services and emergency services. Examples of the normal communication services may be, but are not limited to, a streaming service (streaming of multimedia data such as audio, video, text and so on), a file download service, a carousel service (a service for combining file download service and streaming service), a television (TV) service, an Internet Protocol (IP) Multimedia Subsystem (IMS) service, a non-3rd Generation Partnership Project (non-3GPP) service (for example: firewalling or the like), a short messaging service, a Multimedia Messaging Service (MMS), and so on. Examples of the emergency services may be, but are not limited to, an emergency call to local Fire/Ambulance/Police stations, an Internet Protocol (IP) Multimedia Core Network Subsystem (IMS) call, text messages, Public Warning System (PWS) services, Commercial Mobile Alert System (CMAS) services, and so on. The PLMN 202 may be operated by a mobile network operator (MNO) and may be identified using a PLMN identifier (PLMN ID). Embodiments herein use the terms such as "PLMN", "cellular network", "public network", "3GPP access network", and so on, interchangeably to refer to a network that provides the emergency services, and the normal communication services to the UEs 206 in a given region.

The PLMN 202 includes a plurality of Radio Access Networks (RANs)/public RANs 202a and one or more Core Networks (CNs) 202b. The RANs 202a and the one or more CNs 202b may support various Radio Access Technologies (RATs) such as, but are not limited to, a Long Term Evolution (LTE) network, an advanced LTE network, a New Radio (NR)/5G network, a Narrowband Internet of Things (NB-IoT), a Universal Mobile Telecommunications Service (UMTS), a Global System for Mobile Communications (GSM) Enhanced Data rates for GSM Evolution (EDGE) Radio Access Network (GERAN) system or any other next generation networks. The RAN(s) 202a and the CN(s) 202b may comprise of one or more processors/Central Processing Units (CPUs), a memory, a storage, a transceiver, and so on, for performing at least one intended function/operation.

The RAN 202a may comprise of nodes/Base Stations (BSs) such as, but are not limited to, evolved nodes (eNBs), New Radio nodes (gNBs), and so on. The RAN 202a may be configured to connect the at least one UE 206 to the CN 202b. The RAN 202a may be configured to perform radio resource management functions such as, but are not limited to, radio bearer control, radio admission control, connection mobility control, dynamic allocation of resources to the UE in uplink/downlink (scheduling), and so on. Embodiments herein use the terms such as "RAN", "public RAN", "PLMN RAN", "public cell", "PLMN cell", and so on, interchangeably to refer to an access node of the PLMN 202 that connects the UEs 206 to the at least one CN 202b of the PLMN 202.

The CN 202b referred herein may be at least one of an Evolved Packet Core (EPC), a 5G core (5GC) network, or the like. The CN 202b may be connected to the RAN 202a and an external data network. Examples of the external data network may be, but are not limited to, the Internet, a Packet Data Network (PDN), an IP Multimedia Core Network Subsystem, and so on. The CN 202b may be configured to connect the UEs 206 (that are connected to the associated RAN 202a) to the external data network for the normal communication services or the emergency services. Embodiments herein use the terms such as "CN", "public CN", "PLMN CN", and so on, interchangeably to refer to a core network of the PLMN 202 that connects the UEs 206 to the external data network for the PLMN services.

The NPN(s) 204 may be configured to provide coverage and private services to the UEs 206 present within a location/premises such as, but are not limited to, an organization, an enterprise, an industry/factory, a campus, a room, a floor, a hospital, a stadium, an airport, a shopping center, and so on. The private services may include services that are defined by the respective premises. Examples of the private services may be, but are not limited to, a streaming service (streaming of multimedia data such as audio, video, text and so on), a file download service, a mission-critical service (for example, autonomous driving, control of a smart grid, smart operation of industrial automation processes, or any other service which requires different levels of security), and so on. The NPN 204 may be deployed as a non-standalone NPN, or a Standalone NPN (SNPN). The non-standalone NPN/Public Network Integrated NPN (PNI-NPN) may be deployed in conjunction with the PLMN 202 using a network slicing and/or a Closed Access Group (CAG) cell (as specified in 3GPP TS 23.501). The network slicing provides dedicated data network names (DNNs) networks, or one or more network slice instances that can make the non-standalone NPN available to the UEs 206 via the PLMN 202. The SNPN may be deployed without requiring the support of the PLMNs 202. The SNPN may be identified using a combination of the PLMN ID and a Network Identifier (NID). In an embodiment, the NPN 204 may be considered as the SNPN 204. Embodiments herein use the terms such as "NPN", "private network", "SNPN", and so on, interchangeably to refer to a network that confines communication services/private services within boundaries of the defined premises for the UEs 206.

The SNPN 204 includes one or more non-public RANs 204a, and one or more non-public CNs 204b. The non-public RANs 204a and the non-public CNs 204b may support the various RATs. The non-public RAN 204a referred herein may be a node including at least one of 3GPP access nodes, non-3GPP access nodes, and so on, supporting the various RATs. Examples of the 3GPP access nodes may be, but are not limited to, eNBs, gNBs, and so on. Examples of the non-3GPP access nodes may be, but are not limited to, a Local Access Network (LAN) node, a Wireless LAN (WLAN) node, a Wi-Fi node, and so on. In an embodiment, the non-public RAN 204a may be configured to connect the UE(s) 206 to the non-public CN 204b. Embodiments herein use the terms such as "non-public RAN", "SNPN RAN", "non-public/SNPN BS", "private RAN/BS", "SNPN cell", and so on, to a node of the SNPN 204 that connects the UE 206 to the non-public CN 204b of the SNPN 204.

The non-public CN 204b referred herein may be at least one of an EPC network, a 5GC network, or the like. The non-public CN 204b may be connected to the non-public RAN 204a, a private data network/private enterprise network, and the CN 202b of the PLMN 202. The private data network/private enterprise may be operated by at least one of the enterprise, the organization, the industry, an external entity, or the like. Examples of the private data network may be, but are not limited to, an Intranet, a cloud platform, a server, and so on. In an embodiment, the non-public CN 204b may be configured to connect the UE 206 (that is connected to the non-public RAN 204a) to the private data network for the private services defined within the premises. In an embodiment, the non-public CN 204b may also be configured to connect the UE 206 (that is connected to the non-public RAN 204a) to the PLMN 202 for the PLMN services (i.e., the normal communication services and the emergency services). Embodiments herein use the terms such as "non-public CN", "private CN", and so on, interchangeably through the document.

The UE(s) 206 referred herein may be a user device that is capable of supporting the PLMN 202, the SNPN 204, the PNI-NPN, or the like. Examples of the UE 206 may be, but are not limited to, a mobile phone, a smartphone, a tablet, a phablet, a personal digital assistant (PDA), a laptop, a computer, a wearable computing device, a vehicle infotainment device, an Internet of Things (IoT) device, a Virtual Reality (VR) device, a Wireless Fidelity (Wi-Fi) router, a USB dongle, a sensor, a robot, an auto-guided vehicle, or any other devices capable of supporting the PLMN 202, the SNPN 204, the PNI-NPN, or the like.

The UE 206 may be configured to operate in various access modes such as, a PLMN access mode, a Closed Access Group (CAG) access mode, a Closed Subscriber Group (CSG) access mode, a SNPN access mode, or the like.

The UE 206 may operate in the PLMN access mode to access the PLMN 202 for the PLMN services. The PLMN access mode in a mode/state in which the UE 206 may access only the PLMN 202 for the communication services. In the PLMN access mode, the UE 206 selects and registers with the PLMN 202 to access the PLMN for the PLMN services. The UE 206 selects the PLMN 202 in an automatic PLMN selection mode or a manual PLMN selection mode, while operating in the PLMN access mode. In the automatic PLMN selection mode, the UE 206 automatically selects the PLMN based on broadcasted available PLMN IDs. Embodiments herein use the terms such as "automatic PLMN selection mode", "automatic mode/state", "automatic selection mode", "automatic selection", and so on, interchangeably to refer to a mode in which the UE 206 searches and/or selects the PLMN 202 automatically from the broadcasted available PLMN IDs. In the manual PLMN selection mode, the UE 206 allows a user to select the PLMN using the available PLMN IDs. Embodiments herein use the terms such as "manual PLMN selection mode", "manual mode", "manual selection mode", "manual selection", "manual state", and so on, interchangeably to refer to a mode in which the user of the UE 206 searches and/or selects the PLMN 202 manually from the available PLMN IDs. Selecting and registering with the PLMN 202 may be performed by according to the 3GPP specification.

The UE 206 may operate in the CAG access mode to access the PNI-NPN for the private services. The CAG access mode is a mode/state in which the UE 206 may access only a CAG cell served by the PNI-NPN. In the CAG access mode, the UE 206 connects to at least one CAG cell to access the PLMN 202, wherein the CAG cell provides the private services to the UE 206.

The UE 206 may operate in the CSG access mode for a connectivity access to a femtocell. The CSG may be a group depicting a limited set of users/UEs having the connectivity access to the femtocell. The CSG access mode is a mode/state in which the UE 206 may access only a CSG cell for the connectivity access to the femtocell. The CSG cell may be a part of the PLMN 202 broadcasting a CSG ID. The CSG cell may be accessible by the UE 206, which has the CSG ID as part of an allowed CSG list.

The UE 206 may operate in the SNPN access mode to access the SNPN 204 for the private services. The SNPN access mode is a mode/state in which the UE 206 may access only the SNPN 204 for the private services.

Embodiments herein enable the UE 206 to manage the SNPN access mode.

In the SNPN access mode, the UE 206 selects and attempts to register with the SNPN 204 to access the private services. The UE 206 selects the SNPN 204 in an automatic SNPN selection mode or a manual SNPN selection mode or a "No Subscriber Identity Module (SIM) state", while operating in the SNPN access mode. In the automatic SNPN selection mode, the UE selects and attempts to register with the available SNPN identified by the PLMN ID and the NID, for which the UE 206 has a Subscription Permanent Identifier (SUPI) and credentials of the SNPN 204. Embodiments herein use the terms such as "automatic SNPN selection mode", "automatic mode/state", "automatic selection mode", "automatic selection", and so on, interchangeably to refer to a mode in which the UE 206 selects and attempts to register with the available SNPN for which the UE 206 has the SUPI and the credentials. In the manual network selection mode, the UE 206 provides the list of available NIDs and related human-readable names (if available) of the available SNPNs 204 for which the UE 206 has the SUPI and the credentials of each subscribed SNPN 204 to a user. The user selects the SNPN 204 from the available SNPNs and the UE 206 attempts to register with the selected SNPN 204. Embodiments herein use the terms such as "manual SNPN selection mode", "manual mode", "manual selection mode", "manual selection", "manual state", and so on, interchangeably to refer to a mode in which the user of the UE 206 selects and attempts to register with the SNPN 204 based on the provided list of available NIDs. The "No Subscriber Identity Module (SIM) state" may depict that the UE 206 does not have any Subscriber Identity Module (SIMs) (i.e., a list of SIMs for the UE 206 is empty). The UE 206 may select and attempt to register with the SNPN according to the 3GPP Technical Specification 23.122 version 16.6.1 and 24.501 version 16.5.1.

For registering with the selected SNPN 204, the UE 206 sends a registration request to the non-public CN 204*b* of the selected SNPN 204. In an example, the non-public CN 204*b* of the SNPN 204 accepts the registration request of the UE 206 and sends a registration accept to the UE 206, thereby the UE 206 successfully registers with the SNPN 204. In another example, the non-public CN 204*b* of the SNPN 204 does not accept the registration request of the UE 206 and sends a registration reject to the UE 206, thereby the UE 206 does not register with the SNPN 204 (i.e., unsuccessful registration). In such a scenario, the UE 206 camps on any available SNPN. In another example, the selected SNPN 204 may not found or the selected SNPN 204 may be Out of Service (OOS), or the UE 206 loses the coverage of the selected SNPN 204. In such a scenario, the UE 206 camps on any available SNPN.

Based on results of the registration, the UE 206 enters a first state or second state. The UE 206 enters the first state, when the UE 206 successfully registers with the selected SNPN 204. The first state may be an active state, wherein the UE 206 may access the SNPN 204 for the private services. Embodiments herein use the terms such as "active state", "first state", and so on, interchangeably to refer to a state in which the UE 206 may access the private services from the SNPN 204.

The UE 206 enters the second state, when the UE 206 does not register with the selected SNPN or the selected SNPN is not found (i.e., camping on any available SNPNs). The second state is a limited-service state or no service state, wherein the UE 206 may not access the camped SNPN to access the private services. The limited-service state in the SNPN access mode may not provide the same services as provided by the PLMN 202 in the limited-service state. In an example, the limited-service state in the SNPN access mode does not support the emergency services or the PWS services. Thus, the limited-service state in the SNPN access mode refers to no-service. Embodiments herein use the terms such as "second state", "limited-service state", "no service state", "limited service", and so on, interchangeably to refer to a state in which the UE 206 may not be able to access the private services in the SNPN access mode.

In an embodiment, on entering the first state or the second state, the UE 206 may initiate the emergency service(s) on the registered or camped SNPN 204, while operating in the SNPN access mode. In an example, the user of the UE 206 may initiate the emergency service. In another example, the network 202 may trigger the emergency service. In another example, one or more applications present in the UE 206 may initiate the emergency service. In order to perform the initiated emergency service, the UE 206 disables the SNPN access mode, as the registered/camped SNPN 204 does not support the emergency services. On disabling the SNPN access mode, the UE 206 enables the PLMN access mode. In the PLMN access mode, the UE 206 selects the public RAN/PLMN cell 202*a* supporting the emergency service. The UE 206 performs the emergency service by camping on the selected PLMN cell 202*a*.

In another embodiment, on entering the second state, the UE 206 disables the SNPN access mode, as the SNPN 204 does not support the emergency services. On disabling the SNPN access mode, the UE 206 enables the PLMN access mode. In the PLMN access mode, the UE 206 selects the public RAN/PLMN cell 202*a* supporting the emergency service. Whenever the emergency service is initiated, the UE 206 performs the emergency service by camping on the selected PLMN cell 202*a*.

On completion of the initiated emergency service, the UE 206 enables the SNPN access mode for performing a SNPN selection procedure. The SNPN selection procedure involves selecting and attempting to register with the SNPN 204 for the private communication services.

In an embodiment, the UE 206 may also disable the SNPN access mode, when the UE 206 fails to register with the SNPN 204 or the SNPN 204 is not found (i.e., the SNPN 204 is OOS), and the UE 206 enters limited camping and camps on any available SNPN 204 which does not support the emergency services and Public Warning System (PWS) notifications. The UE 206 may receive the PWS notifications in emergency scenarios, wherein life or property is at imminent risk and a responsive action is required. Examples of the emergency scenarios may be, but are not limited to, earthquakes, tsunamis, hurricanes, wildfires, severe storms, ongoing criminal actions (like child abductions or terrorist actions), and so on. Embodiments herein use terms such as, "PWS notifications", "PWS alerts", 'PWS services", and so on, interchangeably through the document. On disabling the SNPN access mode, the UE 206 enables the PLMN access mode and receives the PWS notifications from the PLMN cell 202*a* selected in the PLMN access mode.

In an embodiment, the UE 206 may exit/disable the SNPN access mode and select the PLMN access mode when the UE 206 may not be able to access the normal communication services. A trigger for the UE 206 to exit the SNPN access mode and select the PLMN access mode may be, initiating the emergency service by the user/UE 206, the registration reject/SNPN registration reject, no emergency support on the selected SNPN 204, no PWS notification support on the selected SNPN 204, or the like. In the selected PLMN access mode, the UE 206 performs the SNPN search procedure through a background scan. The UE 206 performs the SNPN search procedure through the background scan after camping on the selected PLMN cell 202*a* in the PLMN access mode. The UE 206 enables the SNPN access mode if the SNPN 204 is detected and selected from the SNPN search procedure for the registration. If the selected SNPN 204 supports the emergency services or if the user configures the SNPN specific PWS message Ids or a SNPN subscription list of the UE 206 have the SNPN specific PWS message Ids, the UE 206 configures the SNPN specific PWS messages Ids to the AS layer. The SNPN subscription list indicates the SNPNs for which the UE 206 has the SUPI and the credentials. Also, the UE 206 configures the SNPN specific PWS message Ids to the AS during a power ON to differentiate the SNPN specific PWS message Ids for using in the SNPN access mode and the PLMN access mode.

The UE 206 disables the SNPN search procedure through the background scan in the PLMN access mode if the emergency service is initiated on the camped PLMN cell 202a of the PLMN 202 or if the registration reject is received from the selected SNPN 204 or if the selected SNPN 204 does not support the emergency services or the PWS notifications, or the like.

Embodiments herein also enable the UE 206 to manage the SNPN access mode, when the user performs the SNPN selection procedure in the manual SNPN selection mode.

When the UE 206 is operating in the SNPN access mode, the user of the UE 206 performs the SNPN search procedure in the manual SNPN selection mode. In an example scenario, consider that the user does not select any SNPN while performing the SNPN search procedure in the manual SNPN selection mode. In such a scenario, the UE 206 may enter the second state. To prevent entering the second state, the UE 206 selects the previous registered SNPN 204 and attempts to register with the selected SNPN 204 for the private services in the automatic SNPN selection mode. In another embodiment, the UE 206 determines the previous SNPN 204 selected by the user manually (i.e., already in the manual SNPN selection mode) prior to performing the SNPN selection procedure manually by the user and selects the determined SNPN 204 for the registration.

In another embodiment, if the UE 206 is not present in the SNPN access mode prior to the SNPN search procedure performed by the user in the manual SNPN selection mode or the selected SNPN 204 is not valid or the selected SNPN is not available for the UE 206, the UE 206 may enter the second state by camping on any acceptable SNPN 204.

In another embodiment, if the UE 206 is not present in the SNPN access mode prior to the SNPN search procedure performed by the user in the manual SNPN selection mode, the UE 206 may receive a trigger to disable the SNPN access mode. In an example, the UE 206 may receive the trigger to disable the SNPN access mode, which is a timer-based trigger (which may be generated by operating a timer). In another example, the UE 206 may receive the trigger (for example, the timer-based trigger) from an Application Processor (AP) 310 to disable the SNPN access mode. In another example, the UE 206 may receive the trigger (for example, the timer-based trigger) from a Communication Processor (CP) 312 to disable the SNPN access mode. In another example, the UE 206 may receive the trigger from the user (i.e., a user-based trigger) to disable the SNPN access mode.

On receiving the trigger to disable the SNPN access mode, the UE 206 disables the SNPN access mode and enters a previous access mode. Also, the network 202 may disable the SNPN access mode. Also, the user or the PLMN 202 or the AP or the CP may disable the SNPN access mode on the UE 206. In an example, the previous access mode may be the PLMN access mode. In another example, the previous access mode may be the CSG access mode. In another example, the previous access mode may be the CAG access mode.

Embodiments herein also enable the UE 206 to save/store each access mode and associated/related configurations.

The UE 206 saves/stores information about the previous access mode and the associated configurations, while operating in a current access mode. In an example, the current access mode and the previous access mode include one of, the SNPN selection mode, the PLMN access mode, the CSG access mode, and the CAG access mode. In an example, the stored information about the previous access mode and the associated configurations may include at least one of, but is not limited to, a PLMN/SNPN/CAG/CSG ID (depending upon the previous access mode), PWS message IDs/SNPN specific PWS message IDs, or the like.

In an embodiment, the UE 206 maintains a separate memory portion (for example: Non-Volatile (NV) memory portions) for each access mode and the associated configurations.

The UE 206 uses the saved information about the previous access mode and the associated configurations to return to the previous access mode, on disabling the current access mode. The UE 206 may also configure PWS message Ids of the corresponding access mode to the AS, on returning to the previous access mode. In an example, the PWS message Ids of the previous access mode may be the SNPN specific PWS message Ids, if the previous access mode is the SNPN access mode. In another example, the PWS message Ids of the previous access mode may be PLMN specific PWS message Ids, if the previous access mode is the PLMN access mode.

Embodiments herein also enable the UE 206 to provide an indication to the user about the access modes.

The UE 206 provides the indication to the user on enabling or disabling of each access mode. In an example, the indication may be in a form of at least one of, a pop up, an audio alert, a visual alert, an image, a button, graphics, text, icons, symbols, vibration signals, and so on.

In an example, the UE 206 provides the indication to the user, on disabling/exiting or enabling the selected access mode. In another example, the UE 206 provides the indication to the user after disabling the SNPN access mode due to the initiation of the emergency service. The UE 206 also provides the indication to the user on enabling the SNPN access mode after the completion of the emergency service. In another example, the UE 206 also provide the indication to the user, when the selected SNPN 204 is unavailable for the normal service and the selected SNPN 204 does not support the emergency services. The UE 206 also provides the indication to the user, when the suitable SNPN 204 is available for the normal service through the background scan. In another example, the UE 206 also provides the indication to the user about an exit of the current access mode and waits for an input from the user to exit from the current access mode. In an example, the input may be a permission from the user (for example, Yes or No inputs) to exit the current access mode. The UE 206 may automatically exit from the current access mode based on a timer action (generated by operating the timer), if the UE 206 does not receive the input from the user.

In an embodiment, the UE 206 also provides the indication to the user about the second state/limited-service state/ no service, when the user does not select any cell/RAN manually in the current access state for the communication services. In an example, the cell may include the non-public RAN 204a, if the current access mode is the SNPN access mode. In another example, the cell may include the PLMN cell 202a, if the current access mode is the PLMN access mode. In another example, the cell may include a CSG cell (not shown), if the current access mode is the CSG access mode. In another example, the cell may include a CAG cell (not shown), if the current access mode is the CAG access mode. The UE 206 waits for a reception of a selection input from the user to return to the previous access mode. The selection input may depict any of the selected cell from the user. The UE 206 may automatically return to the previous access mode based on the timer action, if the UE 206 does not receive the selection input from the user.

In an embodiment, the UE 206 may disable specific access mode or a combination of some access modes or all access mode except the PLMN access mode, if a network operator does not want the user of the UE 206 to access the access modes except the default PLMN access mode.

FIG. 2 show exemplary blocks of the wireless network 200, but it is to be understood that other embodiments are not limited thereon. In other embodiments, the wireless network 200 may include less or more number of blocks. Further, the labels or names of the blocks are used only for illustrative purpose and does not limit the scope of the embodiments herein. One or more blocks can be combined together to perform same or substantially similar function in the wireless network 200.

Figure 3:
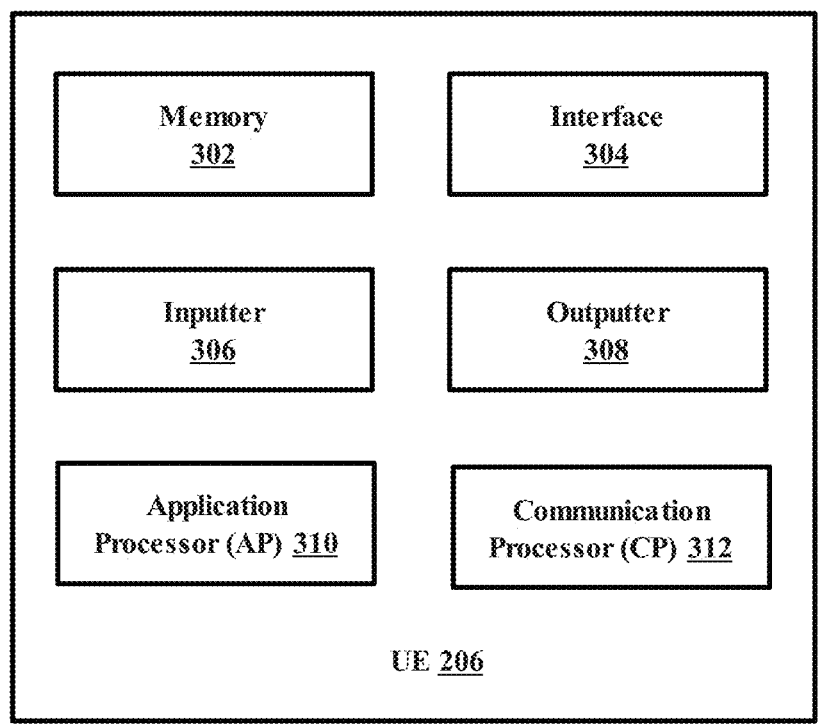
FIGS. 3 and 4 are example block diagrams depicting various components of the UE for managing the SNPN access mode, according to embodiments as disclosed herein.

FIG. 3 is an example block diagram depicting various components of the UE 206 for managing the SNPN access mode, according to embodiments as disclosed herein. The UE 206 includes a memory 302, an interface 304, an inputter 306, an outputter 308, the AP 310, and the CP 312. The UE 206 may also include at least one of, at least one antenna, at least one RF transceiver coupled with the CP 312, a transmission processing circuitry, a reception processing circuitry, a display, Input/Output (IO) ports, and so on (not shown).

The memory 302 stores at least one of, but is not limited to, the access modes and the associated configurations, one or more applications for initiating the emergency services, the one or more timers for initiating the timer action or the timer-based trigger for disabling the SNPN access mode, and so on. Examples of the memory 302 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. The memory 302 may also include one or more computer-readable storage media. The memory 302 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory 302 is non-movable. In some examples, the memory 302 can be configured to store larger amounts of information than the memory. In certain examples, a non-transitory storage medium may store data that can, over time, change (e.g., in Random Access Memory (RAM) or cache).

The interface 304 may be configured to enable the UE 106 to communicate with the PLMN 202, the SNPN 204, or the like through an interface. Examples of the interface may be, but are not limited to, a wired or wireless fronthaul interface, a wired or wireless backhaul interface, or any other structure supporting communications over a wired or wireless connection.

The inputter 306 may be configured to enable the user to the UE 206 to interact with the UE 206. In an example, the inputter 306 may receive information about the access mode selected by the user. In another example, the inputter 306 may receive the input from the user to exit the current access mode. In another example, the inputter 306 may receive the selection input from the user, wherein the selection input includes the cell selected by the user in the current access mode.

The outputter 308 may be configured to provide the indication to the user about the enabling or disabling of the access mode, entering of the UE 206 into the second state, or the like. The outputter 208 may include at least one of, for example, but is not limited to, a sound outputter/voice assistant module, a display, a vibration motor, a User Interface (UI) module, a light emitting device, and so on, to provide the indication to the user. The UI module may provide a specialized UI or graphics user interface (GUI), or the like, synchronized to the UE 206, according to the applications. The outputter 308 may provide the indication to the user in a form of, an audio, a video, an emotion, an image, a button, graphics, text, icons, symbols, vibration signals, and so on.

The AP 310 and the CP 312 include at least one of, a single processer, a plurality of processors, multiple homogeneous or heterogeneous cores, multiple Central Processing Units (CPUs) of different kinds, microcontrollers, special media, and other accelerators.

The AP 310 may be associated with the one or more applications present in the UE 206. The AP 310 may be configured to initiate the emergency services on the UE 206. The CP 312 may be configured to control all the components of the UE 206.

In an embodiment, the AP 310 and/or the CP 312 may be configured to enable or disable the various access modes on the UE 206. In another embodiment, the AP 310 and/or the CP 312 may be configured to manage the SNPN access mode on the UE 206.

Figure 4:
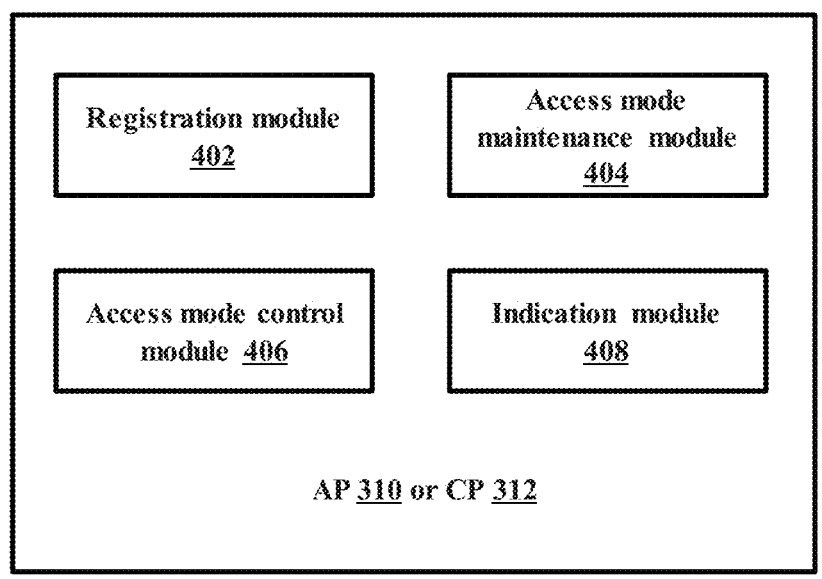

As depicted in FIG. 4, the AP 310 and/or the CP 312 include a registration module 402, an access mode maintenance module 404, an access mode control module 406, and an indication module 408.

The registration module 402 may be configured to select the SNPN 204 and enable the UE 206 to attempt to register with the selected SNPN 204 for the private communication services, when the UE 206 is operating in the SNPN access mode.

The registration module 402 selects the SNPN 204 in the automatic SNPN selection mode or the manual SNPN selection mode or in the "No SIM state", while the UE 206 is operating in the SNPN access mode. The registration module 402 initiates the registration with the selected SNPN 204.

In an embodiment, if the registration is successful, the registration module 402 enables the UE 206 to enter the first/active state, wherein the UE 206 may access the private services from the registered SNPN 204. The registration module 402 also determines the initiation of the emergency service(s) on the registered SNPN 204. In such a scenario, the registration module 402 provides instructions to the access mode control module 406 to disable the SNPN access mode, as the registered SNPN 204 does not support the emergency services.

In another embodiment, if the registration is unsuccessful (i.e., the selected SNPN 204 does not accept the UE 206, or the UE 206 loses the coverage of the selected SNPN 204 or the selected SNPN is not found), the registration module 402 enables the UE 206 to camp on any available SNPN 204. In such a scenario, the UE 206 enters the second state/limited-service state/no service state. The registration module 402 further determines the initiation of the emergency service when the UE 206 is in the second state. In such a scenario, the registration module 402 provides instructions to the access mode control module 406 to disable the SNPN access mode.

In another embodiment, the registration module 402 may detect that the UE 206 has been entered the second state due to the unsuccessful registration with the selected SNPN 204 or when the UE 206 loses the coverage from the registered SNPN 204. In such a scenario, the registration module 402 provides instructions to the access mode control module 406 to disable the SNPN access mode prior to trigger of the emergency services.

In another embodiment, the registration module 402 provides instructions to the access mode control module 406 to disable the SNPN access mode, if the selected SNPN 204 in the SNPN access mode does not support the emergency services and the PWS notifications.

In another embodiment, the registration module 402 checks if the UE 206 is configured with the SNPN specific PWS message Ids by the user or if the SNPN subscription list of the UE 206 have the SNPN specific PWS message Ids and if the selected SNPN 204 by the UE 206 supports the emergency services. If the UE 206 is configured with the SNPN specific PWS message Ids by the user or if the SNPN subscription list of the UE 206 have the SNPN specific PWS message Ids and if the selected SNPN 204 by the UE 206 does not support the emergency services, the registration module 402 provides instructions to the access mode control module 406 to disable the SNPN access mode.

The access mode maintenance module 404 may be configured to manage the SNPN access mode, based on the SNPN search procedure performed by the user of the UE 206 manually.

The access mode maintenance module 404 detects that the user has not selected any SNPN 204 from a SNPN list (including the available NIDs) displayed as result of performing the SNPN selection procedure manually, when the UE 206 is in the SNPN access mode. In such a scenario, the access mode maintenance module 404 checks if the UE 206 was present in the SNPN access mode prior to the SNPN search procedure performed by the user.

If the UE 206 was present in the SNPN access mode prior to the SNPN search procedure performed by the user, the access mode maintenance module 404 selects the previously registered SNPN 204 automatically or the SNPN 204 that has been selected by the user manually prior to performing the SNPN search procedure for accessing the private services. If the selected SNPN is not valid, or the selected SNPN is not available, the access mode maintenance module 404 enables the UE 206 to camp on any acceptable SNPN 204, thus the UE 206 enters the second state.

If the UE 206 was not present in the SNPN access mode prior to the SNPN search procedure performed by the user, the access mode maintenance module 404 initiates the trigger for the access mode control module 406 to disable the SNPN access mode and enable the previous access mode. Alternatively, if the UE 206 was not present in the SNPN access mode prior to the SNPN search procedure performed by the user, the access mode maintenance module 404 may receive the timer-based trigger or the user-based trigger for disabling the access mode. The access mode maintenance module 404 provides information about the received trigger to the access mode control module 406 to disable the SNPN access mode and enable the previous access mode.

The access mode maintenance module 404 may also be configured to save the information about the access modes of the UE 206 and the associated configurations. The access mode maintenance module 404 may assign the separate portions/addresses of the memory 302 for saving the information of each access mode of the UE 206 and the associated configurations.

The access mode control module 406 may be configured to enable or disable the various access modes on the UE 206.

In an embodiment, the access mode control module 406 disables the SNPN access mode and enables the PLMN access mode, on receiving the instructions from the registration module 402. In the PLMN access mode, the access mode control module 406 enables the UE 206 to select and camp on the suitable PLMN cell 202a. The access mode control module 406 also performs the emergency service(s) initiated by the application(s) on the selected PLMN cell 202a. Once the initiated emergency service has been completed, the access mode control module 406 enables the SNPN access mode by disabling the PLMN access mode.

In an embodiment, the access mode control module 406 disables the SNPN access mode and enables the PLMN access mode, on receiving the instructions from the registration module 402 when the selected SNPN 204 in the SNPN access mode does not support the emergency services and the PWS notifications.

In another embodiment, the access mode control module 406 performs the SNPN selection procedure through the background scan on the selected PLMN cell 202a, on the PLMN access mode is being enabled by disabling the SNPN access mode prior to the initiation of the emergency service or on determining that the selected SNPN 204 in the SNPN access mode does not support the emergency service and the PWS notifications in the limited service. If the SNPN 204 is detected and selected from the SNPN selection procedure, the access mode control module 406 enables the SNPN access mode. If the emergency call is initiated on the selected PLMN cell 202a, the access mode control module 406 terminates the SNPN selection procedure through the background scan.

In another embodiment, the access mode control module 406 configures the SNPN specific PWS message Ids to the AS for reception of the PWS notifications, when the selected SNPN 204 in the SNPN access mode supports the emergency services and if the user configures the SNPN specific PWS message Ids or the SNPN subscription list of the UE 206 have the SNPN specific PWS message Ids.

In another embodiment, the access mode control module 406 configures the SNPN specific PWS message Ids to the AS during the power ON of the UE 206 to differentiate the SNPN specific PWS message Ids for using in the SNPN access mode and the PLMN access mode. Similarly, the access mode control module 406 shares/configured the PWS message ids of the respective access modes to the AS. The AS may use the corresponding message Ids depending on the configured access mode.

In another embodiment, the access mode control module 406 disables the SNPN access mode and enables the previous access mode, on receiving the trigger to disable the SNPN access mode from the access mode maintenance module 404.

In another embodiment, the access mode control module 406 disables the current access mode and enables the previous access mode using the information about the access mode and the related configurations stored by the access mode maintenance module 404 in the memory 302. The access mode control module 406 disables the current access mode and enables the previous access mode, on receiving at least one of, the timer-based trigger, the trigger received from the access mode maintenance module 404, the user-based trigger, or the like.

The indication module 408 may be configured to provide the indication to the user through the outputter 308, on enabling or disabling the access mode on the UE 206.

FIGS. 3 and 4 show exemplary blocks of the UE 206, but it is to be understood that other embodiments are not limited thereon. In other embodiments, the UE 206 may include less or more number of blocks. Further, the labels or names of the blocks are used only for illustrative purpose and does not limit the scope of the embodiments herein. One or more blocks can be combined together to perform same or substantially similar function in the UE 206.

Figure 5:
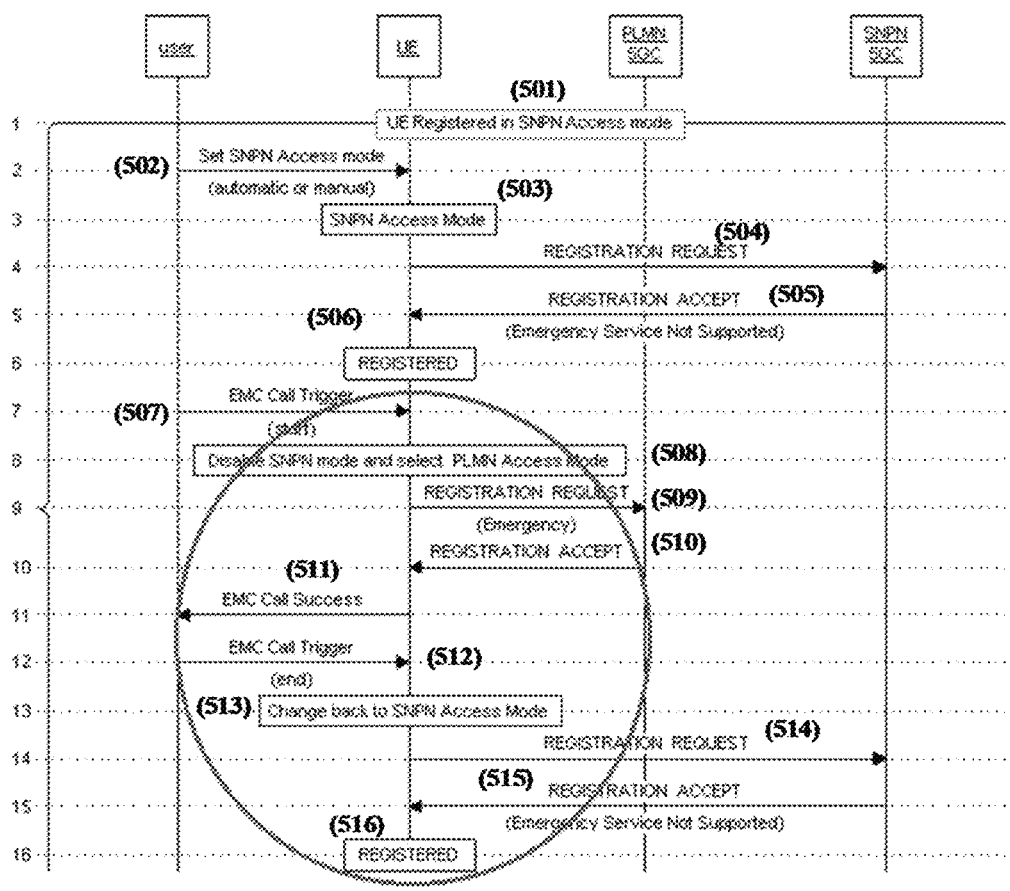
FIGS. 5, 6, and 7 are example sequence diagrams depicting management of the SNPN access mode for the emergency services, according to embodiments as disclosed herein.
Figure 6:
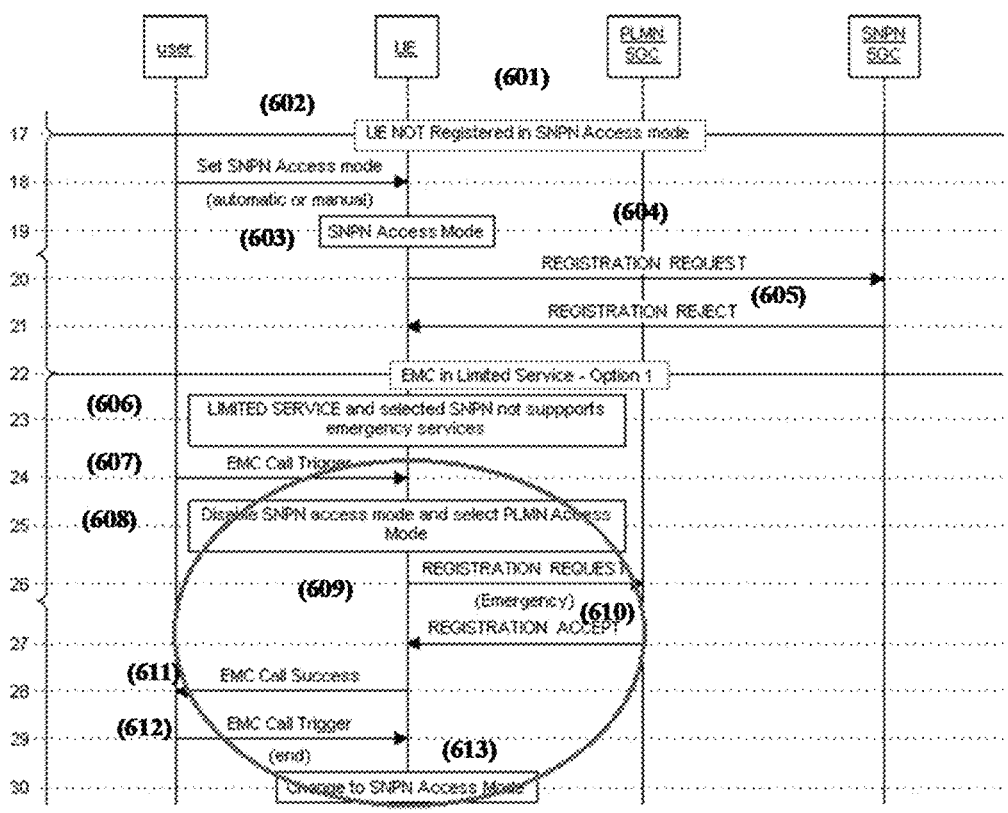
Figure 7:
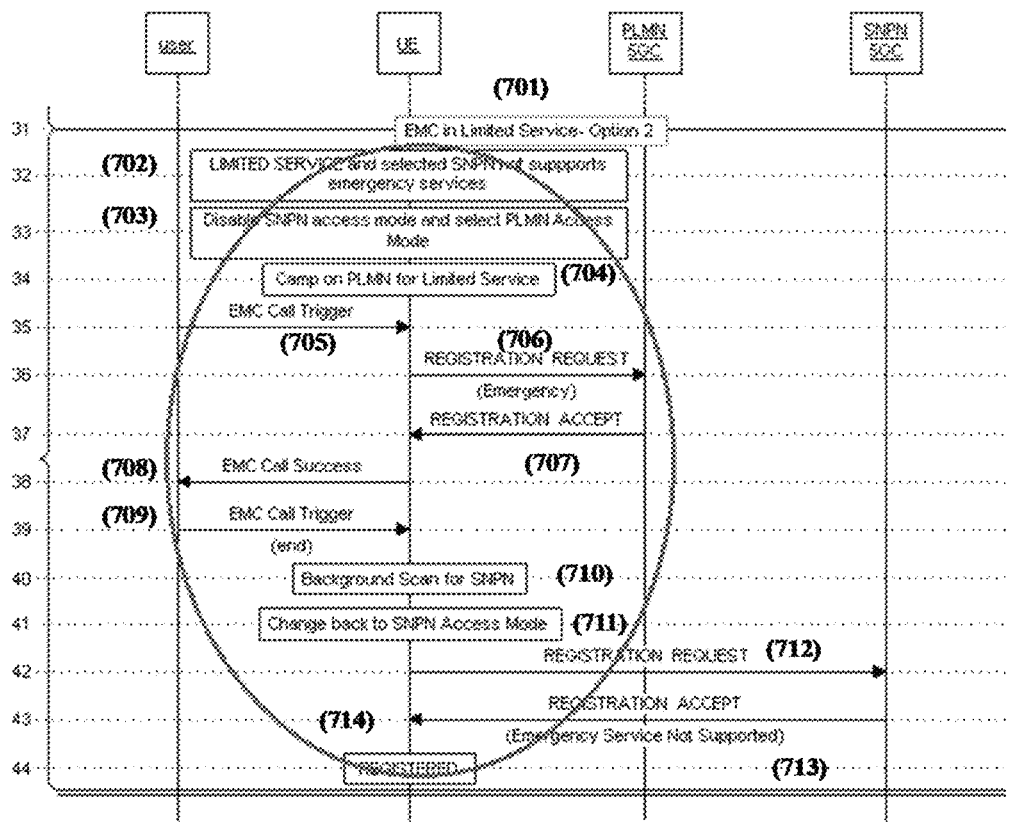

FIGS. 5, 6, and 7 are example sequence diagrams depicting management of the SNPN access mode for the emergency services, according to embodiments as disclosed herein.

Consider an example scenario, as depicted in FIG. 5, at step 501, the UE 206 registers in the SNPN access mode. At step 502, the UE 206 receives the trigger from the user (i.e., the user-based trigger) to enable the SNPN access mode. At step 503, the UE 206 enables the SNPN access mode.

At step 504, the UE 206 selects the SNPN 204 for the registration, while operating in the SNPN access mode and sends the registration request to the CN 204b of the SNPN 204. The UE 206 selects the SNPN 204 in the automatic SNPN selection mode or the manual SNPN selection mode, on the SNPN access mode is being enabled. At step 505, the UE 206 receives the registration accept without an emergency service support from the CN 204b of the SNPN 204. In response to the received registration accept, the UE 206 successfully registers with the selected SNPN 204 at step 506.

At step 507, the UE 206/the user of the UE 206 triggers the emergency service (for example, an emergency (EMC) call). On triggering the emergency call, at step 508, the UE 206 disables the SNPN access mode and enables the PLMN access mode.

On the PLMN access mode is being enabled, at step 509, the UE 206 selects the PLMN 202 and sends the registration request with type emergency to the CN 202b of the selected PLMN 202 through the PLMN cell 202a. At step 510, the UE 206 receives the registration accept from the CN 202b of the PLMN 202, thus the UE 206 successfully registers with the PLMN 202. On receiving the registration accept and performing relevant IMS Session Initiation Protocol (SIP) signalling, at step 511 the UE 206 indicates an emergency call success to the user. At step 512, the UE 206 performs the emergency call on the registered PLMN 202.

Once the emergency call has been completed/ended, at step 513, the UE 206 enables the SNPN access mode by disabling the PLMN access mode. On the SNPN access mode is being enabled, at step 514, the UE 206 selects the SNPN 204 for the registration and sends the registration request to the CN 204b of the SNPN 204. At step 515, the UE 206 receives the registration accept from the CN 204b of the SNPN 204. In response to the received registration accept, the UE 206 successfully registers with the selected SNPN 204 at step 516.

Consider an example scenario, as depicted in FIG. 6, at step 601, the UE 206 is not registered in the SNPN access mode. At step 602, the UE 206 receives the user-based trigger to enable the SNPN access mode. At step 603, the UE 206 enables the SNPN access mode.

On the SNPN access mode is being enabled, at step 604, the UE 206 selects the SNPN 204 for the registration and sends the registration request to the CN 204b of the SNPN 204. The UE 206 selects the SNPN 204 in the automatic SNPN selection mode or the manual SNPN selection mode, on the SNPN access mode is being enabled. At step 605, the UE 206 receives the registration reject from the CN 204b of the SNPN 204. Thus, the registration of the UE 206 with the selected SNPN is unsuccessful. In such a scenario, the UE 206 enters the limited-service state by camping on the any available SNPN at step 606, wherein the camped SNPN does not support the emergency service.

While operating in the limited-service state, at step 607, the UE 206 triggers the emergency call. On triggering the emergency call, at step 608, the UE 206 disables the SNPN access mode and enables the PLMN access mode.

On the PLMN access mode is being enabled, at step 609, the UE 206 selects the PLMN 202 and sends the registration request with type emergency to the CN 202b of the selected PLMN 202 through the PLMN cell 202a. At step 610, the UE 206 receives the registration accept from the CN 202b of the PLMN 202, thus the UE 206 successfully registers with the PLMN 202. On receiving the registration accept, and performing the relevant IMS SIP signalling, at step 611, the UE 206 indicates the emergency call success to the user. At step 612, the UE 206 performs the emergency call on the registered PLMN 202. Once the emergency call has been completed/ended, at step 613, the UE 206 enables the SNPN access mode by disabling the PLMN access mode.

Consider an example scenario, as depicted in FIG. 7, wherein the UE 206 is in the limited-service state by camping on the any available SNPN at step 701 due to the unsuccessful registration with the selected SNPN 204. Further, the camped SNPN does not support the emergency services, as depicted at step 702. At step 703, the UE 206 disables the SNPN access mode and selects the PLMN access mode. At step 704, the UE 206 camps on the PLMN for the limited service, on the PLMN access mode is being enabled.

At step 705, the UE 206 triggers the emergency call. On the emergency call has been triggered, at step 706, the UE 206 sends the registration request to the CN 202b of the PLMN 202 through the PLMN cell 202a. At step 707, the UE 206 receives the registration accept from the CN 202b of the PLMN 202, thus the UE 206 successfully registers with the PLMN 202. On receiving the registration accept, at step 708, the UE 206 indicates an emergency call success to the user. At step 709, the UE 206 performs the emergency call on the registered PLMN 202.

Once the emergency call has been completed/ended, at step 710, the UE 206 performs the SNPN search procedure and its availability through the background scan by remaining in the PLMN access mode. If the SNPN 204 is detected from the SNPN search procedure using the background scan, at step 711, the UE 206 enables the SNPN access mode to select the detected SNPN and disables the PLMN access mode.

On the SNPN access mode is being enabled, at step 712, the UE 206 sends the registration request to the CN 204b of the selected SNPN 204. At step 713, the UE 206 receives the registration accept from the CN 204b of the SNPN 204. In response to the received registration accept, the UE 206 successfully registers with the selected SNPN 204 at step 714.

Figure 8:
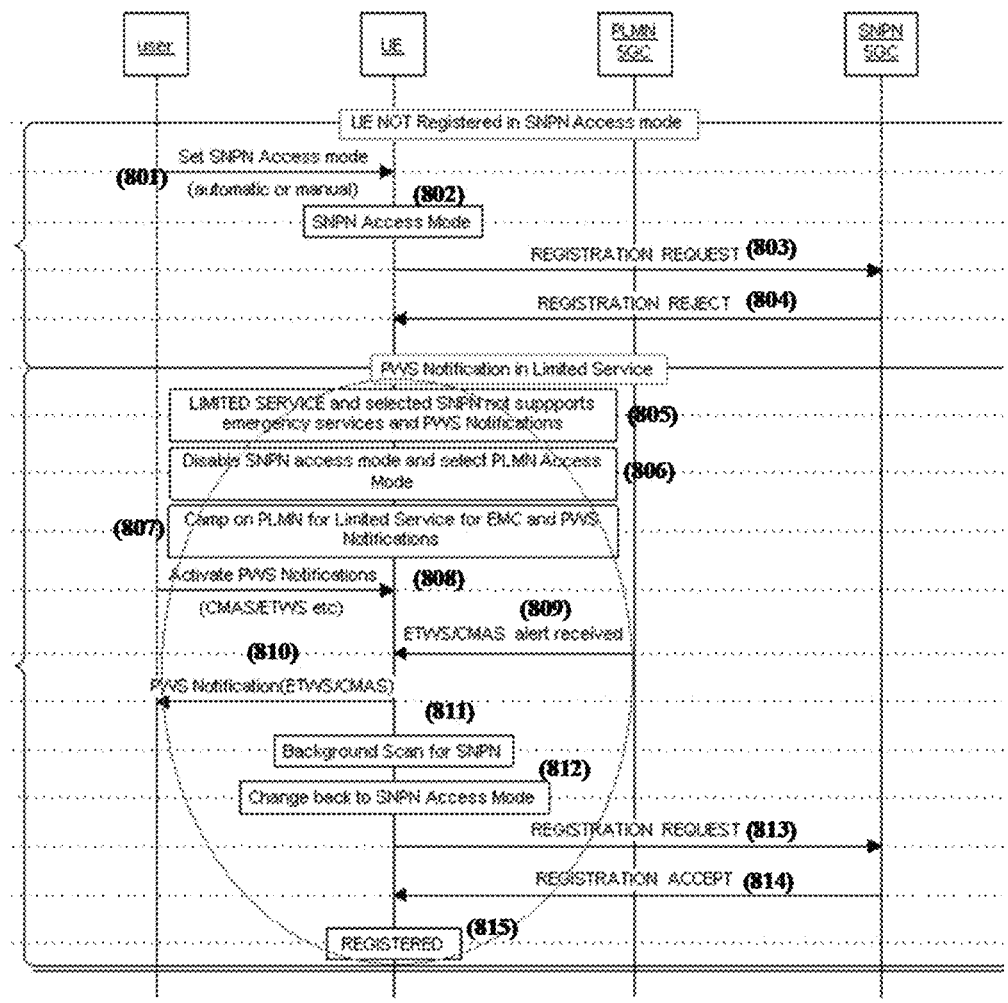
FIG. 8 is an example sequence diagram depicting management of the SNPN access mode for the PWS notifications, according to embodiments as disclosed herein.

FIG. 8 is an example sequence diagram depicting management of SNPN access mode for the PWS notifications, according to embodiments as disclosed herein.

Consider an example scenario, as depicted in FIG. 8, the UE 206 is not registered in the SNPN access mode. At step 801, the UE 206 receives the user-based trigger to enable the SNPN access mode. At step 802, the UE 206 enables the SNPN access mode.

On the SNPN access mode is being enabled, at step 803, the UE 206 selects the SNPN 204 for the registration and sends the registration request to the CN 204*b* of the SNPN 204. The UE 206 selects the SNPN 204 in the automatic SNPN selection mode or the manual SNPN selection mode, on the SNPN access mode is being enabled. At step 804, the UE 206 receives the registration reject from the CN 204*b* of the SNPN 204. Thus, the registration of the UE 206 with the selected SNPN is unsuccessful. In such a scenario, the UE 206 enters the limited-service state by camping on the any available SNPN at step 805, wherein the camped SNPN does not support the emergency services and the PWS notifications.

On entering the limited-service state on the selected SNPN 204 that does not support the emergency services and PWS notifications, at step 806, the UE 206 disables the SNPN access mode and enables the PLMN access mode. On the PLMN access mode is being enabled, at step 807, the UE 206 camps on the PLMN 202 for the limited service for the emergency services and the PWS notifications.

At step 808, the user or the application of the UE 206 activates the PWS notifications (for example, CMAS notifications, Earthquake and Tsunami Warning System (ETWS) notifications, or the like). At step 809, the UE 206 receives the PWS notifications from the CN 202*b* of the PLMN 202. At step 810, the UE 206 forwards the received PWS notifications to the user.

On receiving the PWS notifications, at step 811, the UE 206 performs the SNPN selection procedure through the background scan in the PLMN access mode. If the SNPN 204 is selected from the SNPN selection procedure, at step 812, the UE 206 enables the SNPN access mode by disabling the PLMN access mode.

On the SNPN access mode is being enabled, at step 813, the UE 206 sends the registration request to the CN 204*b* of the selected SNPN 204. At step 814, the UE 206 receives the registration accept from the CN 204*b* of the SNPN 204. In response to the received registration accept, the UE 206 successfully registers with the selected SNPN 204 at step 815.

Figure 9:
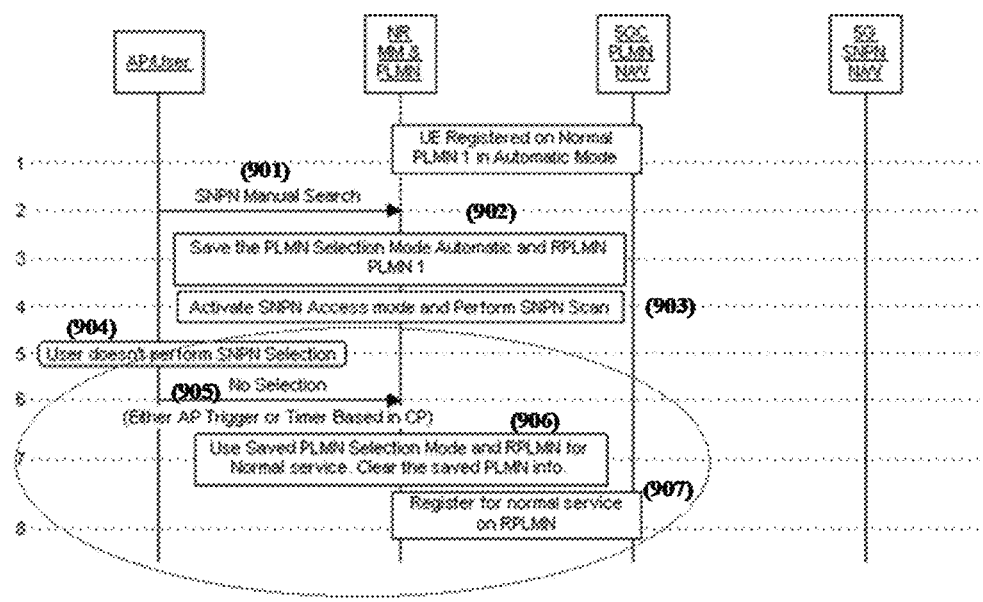
FIG. 9 is an example diagram depicting management of the access modes on the UE, when the user performs the SNPN selection procedure manually, according to embodiments as disclosed herein.

FIG. 9 is an example diagram depicting management of the access modes on the UE 206, when the user performs the SNPN selection procedure manually, according to embodiments as disclosed herein.

Consider an example scenario, as depicted in FIG. 9, wherein the UE 206 is registered on a normal PLMN 1 in the automatic PLMN selection mode. At step 901, the UE 206/user of the UE 206 initiates the trigger for the SNPN selection procedure in the manual SNPN selection mode. At step 902, the UE 206 saves information about the PLMN access mode, and the configurations of the PLMN 1 in the memory 302 using the separate NV. At step 903, the UE 206 enables the SNPN access mode and allows the user to perform the SNPN selection procedure in the manual SNPN selection mode.

At step 904, the user does not perform the SNPN selection procedure or does not select any SNPN. In such a scenario, at step 905, the AP 310 or the CP 312 of the UE 206 initiates the trigger for disabling the SNPN access mode.

On initiating the trigger for disabling the SNPN access mode, at step 906, the UE 206 disables the SNPN access mode, fetches the information about the PLMN access mode and the configurations of the PLMN 1 from the memory 302 and clears the information about the PLMN access mode in the memory 302. At step 907, the UE 206 registers with the PLMN 1 for the normal services using the fetched PLMN access mode and the configurations of the PLMN 1.

Figure 10A:
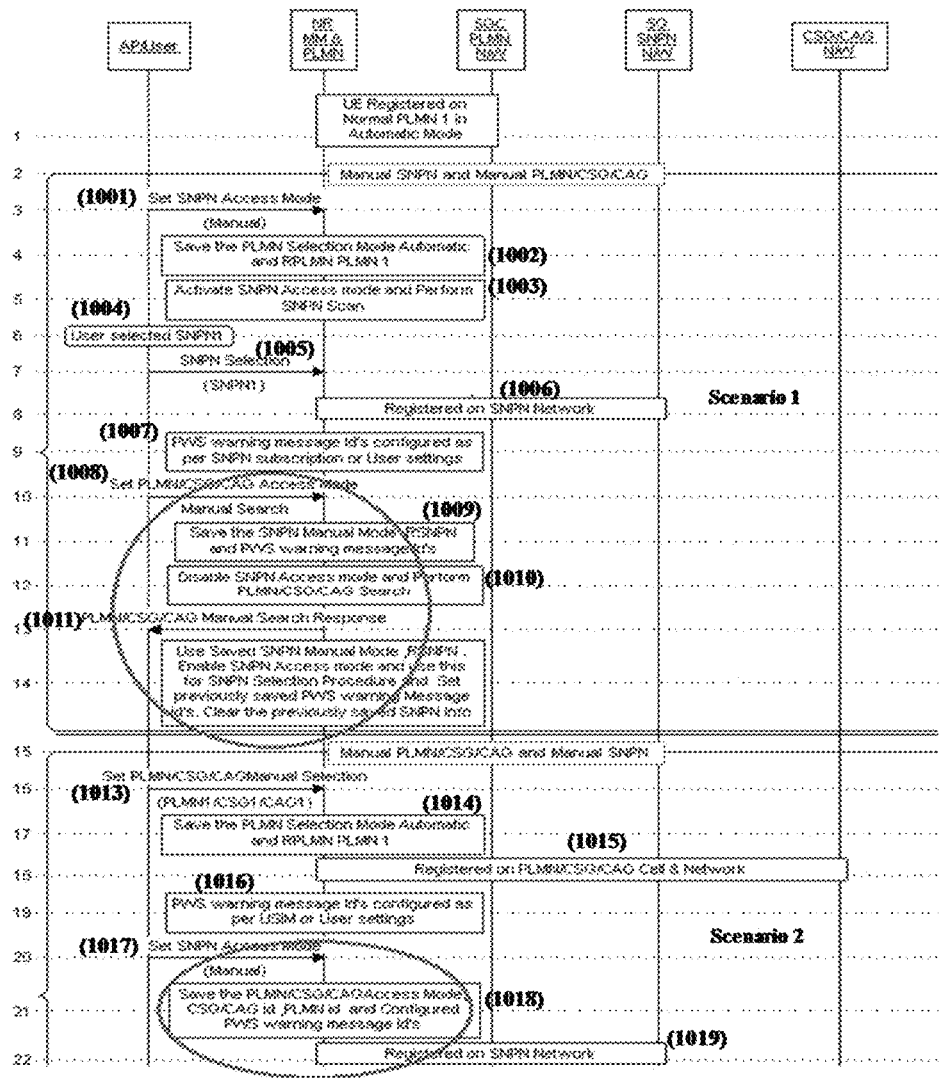
FIGS. 10a and 10b are example sequence diagrams depicting switching between various access mode on the UE, according to embodiments as disclosed herein.
Figure 10B:
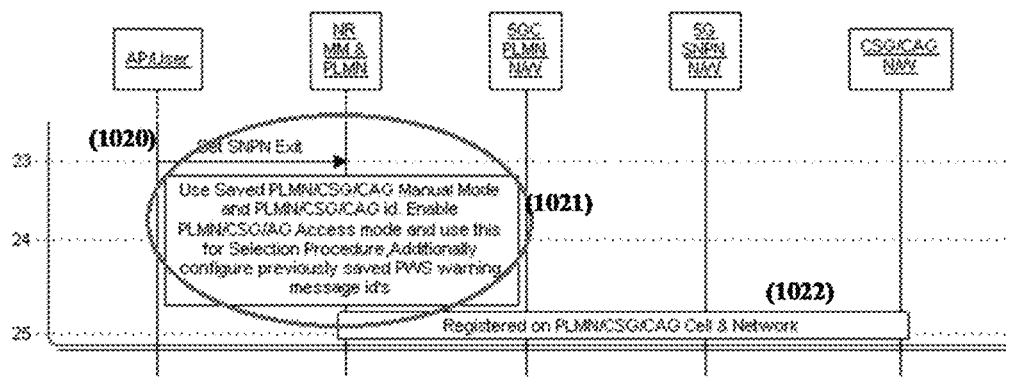

FIGS. 10*a* and 10*b* are example sequence diagrams depicting switching between the various access mode on the UE 206, according to embodiments as disclosed herein.

Consider an example scenario 1, wherein the UE 206 is registered on the normal PLMN (for example, a PLMN 1) in the automatic PLMN selection mode. At step 1001, the user of the UE 206/UE 206 initiates the trigger for enabling the SNPN access mode. In such a scenario, at step 1002, the UE 206 saves the information about the PLMN access mode and the configurations of the PLMN 1 with which the UE 206 is registered in the PLMN access mode in the memory 302. At step 1003, the UE 206 activates the SNPN access mode and allows the user to perform the SNPN search procedure.

At step 1004, the user of the UE 206 performs the SNPN selection procedure manually and selects the SNPN (for example, a SNPN1). At step 1005, the user notifies the UE 206 about the selected SNPN 1. At step 1006, the UE 206 registers on the selected SNPN 1. At step 1007, the UE 206 configures the SNPN specific PWS messages IDs as per the SNPN subscription or user settings.

At step 1008, the user of the UE 206 initiates the trigger for enabling the PLMN/CSG/CAG access mode. In such a scenario, at step 1009, the UE 206 saves the information about the SNPN access mode, the configuration of the SNPN 1 with which the UE 206 is registered in the SNPN access mode, and the SNPN specific PWS message Ids in the memory 302. At step 1010, the UE 206 disables the SNPN access mode and allows the user to perform the cell selection procedure in the PLMN/CSG/CAG selection mode.

At step 1011, the UE 206 sends a PLMN/CSG/CAG manual search response to the user, which indicates the user to perform the selection of the PLMN/CSG/CAG id in the PLMN/CSG/CAG access mode. Upon no selection of PLMN/CSG/CAG id from a list of PLMN/CSG/CAG ids, the UE 206 uses the saved information about the SNPN access mode, the configurations of the SNPN 1 and the SNPN specific PWS message Ids for performing the SNPN search procedure.

Consider an example scenario 2, wherein the UE 206 is in the PLMN/CSG/CAG access mode (manual mode) and registered on the PLMN cell 202*a*/the CSG cell/CAG cell. At step 1013, the user initiates the trigger for enabling the PLMN/CSG/CAG access mode to perform the selection procedure in the manual selection mode. At step 1014, the UE 206 saves information about the PLMN access mode and configurations of the PLMN 1 with which the UE 106 was registered. At step 1015, the UE 206 registers with the PLMN/CSG/CAG cell in the PLMN/CSG/CAG mode. At step 1016, the UE configures the PWS message Ids as per USIM or user settings.

At step 1017, the user initiates the trigger to enable the SNPN access mode. At step 1018, the UE 206 saves the information about the PLMN/CAG/CSG access mode and the associated configurations (such as, a PLMN ID, a CAG ID, a CSG ID, or the like), the PWS message Ids, or the like in the memory 302. At step 1019, the UE 206 allows the user to perform the SNPN selection procedure manually to select the SNPN 204 and registers on the SNPN 204 selected by the user.

At step 1020, the user initiates the trigger to disable the SNPN mode, as depicted in FIG. 10b. On initiating the trigger for disabling the SNPN access mode, at step 1021, the UE 106 fetches the information about the PLMN/CAG/CSG access mode and the associated configurations (such as, a PLMN ID, a CAG ID, a CSG ID, or the like), the PWS message Ids, or the like from the memory 302 and enables the PLMN/CAG/CSG access mode to register on the PLMN/CAG/CSG cell using the fetched information at step 1022.

The embodiments disclosed herein can be implemented through at least one software program running on at least one hardware device and performing network management functions to control the elements. The elements shown in FIGS. 2, 3, and 4 can be at least one of a hardware device, or a combination of hardware device and software module.

The embodiments disclosed herein describe methods and systems for managing SNPN access mode. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g., Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the inventive concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

We claim:

1. A method for managing a Standalone Non-Public Network (SNPN) access mode on a User Equipment (UE), the method performed by the UE and comprising:
    selecting a SNPN for a first registration, when the SNPN access mode is enabled;
    disabling, the SNPN access mode, when the selected SNPN does not support at least one emergency service;
    enabling a Public Land Mobile Network (PLMN) selection mode to select a PLMN cell supporting the at least one emergency service, based on the SNPN access mode being disabled;
    performing the at least one emergency service by camping on the selected PLMN cell; and
    after the at least one emergency service is completed, while camped on the selected PLMN cell, performing a SNPN search procedure through a background scan, enabling the SNPN access mode again when a SNPN is detected from the SNPN search procedure and selecting the detected SNPN for a second registration; and disabling the SNPN search procedure through the background scan, when another emergency service is initiated while camped on the selected PLMN cell.

2. The method of claim 1, wherein enabling the SNPN access mode includes:
    enabling the SNPN access mode in one of, an automatic mode, a manual mode, and a "No Subscriber Identity Module (SIM) state".

3. The method of claim 1, wherein disabling the SNPN access mode includes:
    disabling the SNPN access mode, when initiating the at least one emergency service by a user or a network after entering a first state or a second state based on results of the registration with the selected SNPN; or
    disabling the SNPN access mode, when entering the second state.

4. The method of claim 3, wherein entering the first state or the second state includes:
    entering the first state in the SNPN access mode, if the registration with the selected SNPN is successful, wherein the first state is an active state; and
    entering the second state in the SNPN access mode, if the registration with the selected SNPN is unsuccessful or if the UE loses a coverage on the selected SNPN, wherein the second state in a limited-service state.

5. The method of claim 1, wherein disabling the SNPN access mode includes:
    disabling the SNPN access mode when the selected SNPN does not support the at least one emergency service, wherein the at least one emergency service includes an Internet Protocol (IP) Multimedia Core Network Subsystem (IMS) call, text messages, Public Warning System (PWS) services, and Commercial Mobile Alert System (CMAS).

6. The method of claim 1, further comprising:
    configuring specific PWS message identifiers (Ids) to an Access Stratum (AS) layer for reception of PWS notifications, when the selected SNPN in the SNPN access mode supports the at least one emergency service and when a user configures the SNPN specific PWS message Ids or a SNPN subscription list of the UE have the SNPN specific PWS message Ids.

7. The method of claim 6, further comprising:
    configuring the SNPN specific PWS message Ids to the AS during a power ON to differentiate the SNPN specific message Ids for using in the SNPN access mode and the PLMN access mode.

8. The method of claim 1, further comprising:
    selecting the SNPN for the registration in the SNPN access mode, when the SNPN search procedure is performed by a user in a manual mode and the user does not select at least one SNPN, wherein the selected SNPN is the SNPN selected by the UE in an automatic mode or the SNPN selected by the user manually prior to performing the SNPN search procedure.

9. The method of claim 8, further comprising:
receiving a trigger to disable the SNPN access mode, when the UE is not present in the SNPN access mode prior to the SNPN search procedure performed by the user in the manual mode, wherein the trigger is a timer-based trigger in an Application Processor (AP) or a Communication Processor (CP) or a user-based trigger; and
entering a previous access mode on disabling the SNPN access mode based on the received trigger, wherein the previous access mode includes one of, the PLMN access mode, a closed subscriber group (CSG) mode, and a Closed Access group (CAG) mode.

10. The method of claim 9, further comprising disabling the SNPN access mode by one of the user-based trigger a network, the AP, or the CP.

11. The method of claim 8, further comprising:
entering a second state by camping on an acceptable SNPN, when the UE is not present in the SNPN access mode prior to the SNPN search procedure performed by the user in the manual mode or the selected SNPN is not valid or the selected SNPN is not available for the UE.

12. The method of claim 1, further comprising:
saving information about a previous access mode and associated configurations, while operating in a current access mode, wherein the information about the previous access mode and the associated configurations are saved by maintaining a separate Non-Volatile (NV) memory for each access mode and the associated configurations;
returning to the previous access mode using the saved previous access mode and the associated configurations, on disabling the current access mode, wherein the previous access mode and the current access mode include one of, the SNPN access mode, the PLMN access mode, a CSG mode, and a CAG mode; and
configuring PWS message Ids of the previous access mode to an AS, on returning to the previous access mode.

13. The method of claim 12, further comprising:
configuring a list of the PWS message ids corresponding to a plurality of access modes to the AS and enabling the AS to use the PWS message ids from the list corresponding to the current access mode.

14. The method of claim 1, further comprising:
providing an indication to the user about the enabling or disabling of each access mode; and
providing a notification to the user about no service and waiting for reception of an input from the user to return to a previous access mode, when the user does not select a cell in a current access mode, wherein the cell includes one of, the SNPN, the PLMN cell, a CSG cell, and a CAG cell.

15. A User Equipment (UE) comprising:
a memory; and
a processor coupled to the memory configured to:
select a SNPN for a first registration, when the SNPN access mode is enabled;
disable the SNPN access mode, when the selected SNPN does not support at least one emergency service;
enable a Public Land Mobile Network (PLMN) selection mode to select a PLMN cell supporting the at least one emergency service, based on the SNPN access mode being disabled;
perform the at least one emergency service by camping on the selected PLMN cell; and
after the at least one emergency service is completed, while camped on the selected PLMN cell, perform a SNPN search procedure through a background scan, enable the SNPN access mode again when a SNPN is detected from the SNPN search procedure and select the detected SNPN for a second registration; and disable the SNPN search procedure through the background scan, when another emergency service is initiated while camped on the selected PLMN cell.

16. The UE of claim 15, wherein the processor is configured to enable the SNPN access mode in one of, an automatic mode, a manual mode, and a "No Subscriber Identity Module (SIM) state".

17. The UE of claim 15, wherein the processor is configured to:
disable the SNPN access mode, when the at least one emergency service is initiated by a user or a network after the UE enters a first state or a second state based on results of the registration with the selected SNPN; or
disable the SNPN access mode, when the UE enters the second state.

18. The UE of claim 17, wherein the processor is configured to:
enable the UE to enter the first state in the SNPN access mode, when the registration with the selected SNPN is successful, wherein the first state is an active state; and
enable the UE to enter the second state in the SNPN access mode, when the registration with the selected SNPN is unsuccessful or when the UE loses a coverage on the selected SNPN, wherein the second state in a limited—service state.

19. The UE of claim 15, wherein the processor is configured to:
disable the SNPN access mode when the selected SNPN does not support the at least one emergency service, wherein the at least one emergency service includes an Internet Protocol (IP) Multimedia Core Network Subsystem (IMS) call, text messages, Public Warning System (PWS) services, and Commercial Mobile Alert System (CMAS).

\* \* \* \* \*